(12) United States Patent
Cai et al.

(10) Patent No.: US 12,333,589 B2
(45) Date of Patent: Jun. 17, 2025

(54) ITEM RECOMMENDATION METHOD BASED ON IMPORTANCE OF ITEM IN CONVERSATION SESSION AND SYSTEM THEREOF

(71) Applicant: National University of Defense Technology, Hunan (CN)

(72) Inventors: Fei Cai, Hunan (CN); Wanyu Chen, Hunan (CN); Zhiqiang Pan, Hunan (CN); Chengyu Song, Hunan (CN); Yitong Wang, Hunan (CN); Yanxiang Ling, Hunan (CN); Xin Zhang, Hunan (CN); Honghui Chen, Hunan (CN)

(73) Assignee: National University of Defense Technology, Changsha (CN)

( * ) Notice: Subject to any disclaimer, the term of this patent is extended or adjusted under 35 U.S.C. 154(b) by 598 days.

(21) Appl. No.: 17/693,761

(22) Filed: Mar. 14, 2022

(65) Prior Publication Data

US 2022/0198546 A1     Jun. 23, 2022

Related U.S. Application Data

(63) Continuation-in-part of application No. 17/325,053, filed on May 19, 2021, now abandoned.

(30) Foreign Application Priority Data

May 25, 2020  (CN) .......................... 202010450422.4

(51) Int. Cl.
*G06Q 30/0601* (2023.01)
*G06N 5/04* (2023.01)
*G06N 20/00* (2019.01)

(52) U.S. Cl.
CPC .......... *G06Q 30/0631* (2013.01); *G06N 5/04* (2013.01); *G06N 20/00* (2019.01)

(58) Field of Classification Search
USPC ....................................................... 705/7.29
See application file for complete search history.

(56) References Cited

U.S. PATENT DOCUMENTS

| | | | | |
|---|---|---|---|---|
| 11,004,135 | B1* | 5/2021 | Sandler | G06Q 30/0631 |
| 2016/0371274 | A1* | 12/2016 | Ng | G06F 16/24573 |
| 2018/0068371 | A1* | 3/2018 | Krishnamurthy | G06Q 30/0631 |

(Continued)

OTHER PUBLICATIONS

Wu et al., Session-Based Recommendation with Graph Neural Networks, Thirty-Third AAAI Conference on Artificial Intelligence (Year: 2019).*

(Continued)

*Primary Examiner* — Allison M Robinson (57) ABSTRACT

The present disclosure provides an item recommendation method and system based on importance of item in a conversation session and a system thereof. In the present disclosure, an importance extracting module extracts an importance of each item in the conversation session, and then a long-term preference of a user is obtained in combination with the importance and the corresponding item, and then a preference of the user is obtained accurately in combination with a current interest and the long-term preference of the user, and finally item recommendation is performed according to the preference of the user. In this way, the accuracy of the item recommendation is improved.

7 Claims, 8 Drawing Sheets

(56) References Cited

U.S. PATENT DOCUMENTS

| | | | |
|---|---|---|---|
| 2018/0204113 A1* | 7/2018 | Galron | G06Q 30/0631 |
| 2019/0205965 A1* | 7/2019 | Li | G06Q 30/0643 |
| 2020/0104395 A1* | 4/2020 | Bhatia | G06F 16/9024 |
| 2021/0042810 A1* | 2/2021 | Bentubo | G06Q 30/0631 |

OTHER PUBLICATIONS

Zhang et al., Personalized Graph Neural Networks With Attention Mechanism for Session-Aware Recommendation, Oct. 15, 2020, IEEE (Year: 2020).*

* cited by examiner

ITEM RECOMMENDATION METHOD BASED ON IMPORTANCE OF ITEM IN CONVERSATION SESSION AND SYSTEM THEREOF

CROSS-REFERENCE TO RELATED APPLICATION

This application claims priority from the Chinese patent application 202010450422.4 filed May 25, 2020. This application is also a continuation-in-part of U.S. patent application Ser. No. 17/325,053 filed May 19, 2021, entitled "ITEM RECOMMENDATION METHOD BASED ON IMPORTANCE OF ITEM IN CONVERSATION SESSION AND SYSTEM THEREOF" each of which is incorporated herein by reference in its entirety for all purposes.

TECHNICAL FIELD

The present disclosure relates to the field of content recommendation technologies, and in particular to an item recommendation method based on importance of item in a conversation session and a system thereof.

BACKGROUND

Item recommendations based on conversation session are mostly item predictions based on anonymous conversation session with their purpose of predicting an item in which a user is likely to be interested in a next conversation session from a given item set, and recommending the possibly interested item to the user. At present, most of the item recommendation models based on anonymous conversation session focus on an interaction history of a user to predict a preference of the user, thereby recommending items according to the preference of the user. However, in a case of unavailability of some user-item interaction histories, it will be a big challenge to accurately capture a preference of a user.

In view of unavailability of user-item interactions, we need to generate an item recommendation based only on a current on-going conversation session. In existing approaches, for example, recommendations are generated by capturing a preference of a user by applying a gated recurrent unit (GRU) to model time sequence behaviors of the user in a conversation session, or by capturing a main intention of the user by use of an attention mechanism, or the recommendations are predicted by producing an accurate complex transfer relationship between item embedding vectors and modeling items by using a Gated Graph Neural Network (GGNN). In the existing approaches, no sufficient attention is paid to a source of important information and thus an important item in a conversation session cannot be accurately located to generate a preference of a user. After an item embedding vector is generated, the importance of each item is determined simply based on relevance of the item and one or combination of the mixture of the items in a long-term history and the last item. Inevitably, irrelevant items may exist in a conversation session, especially in a long conversation session, thus it is difficult for a recommendation model to focus on the important items. Therefore, it is extremely important to propose an item recommendation model focusing on importance of items in a conversation session in order to improve the accuracy of the item recommendation.

SUMMARY

In view of this, the present disclosure provides an item recommendation method based on importance of item in a conversation session and a system thereof to avoid the influence of irrelevant items in the conversation session on a recommendation accuracy in a method of performing item recommendation based on a current conversation session in the prior art.

Provided is an item recommendation method based on importance of item in a conversation session, configured to predict an item that a user is likely to interact at a next moment from an item set as a target item to be recommended to the user, wherein the following steps are performed based on a trained recommendation model, including:

obtaining an item embedding vector by embedding each item in a current conversation session to one d-dimension vector representation, and taking an item embedding vector corresponding to the last item in the current conversation session as a current interest representation of the user;

obtaining an importance representation of each item according to the item embedding vector, and obtaining a long-term preference representation of the user by combining the importance representation with the item embedding vector;

obtaining a preference representation of the user by connecting the current interest representation and the long-term preference representation by a connection operation;

obtaining and recommending the target item to the user according to the preference representation and the item embedding vector.

Preferably, obtaining the importance representation of each item according to the item embedding vector includes:

converting an item embedding vector set formed by each item embedding vector corresponding to each item in the current conversation session to a first vector space and a second vector space by a non-linear conversion function respectively so as to obtain a first conversion vector and a second conversion vector respectively, wherein the non-linear conversion function is a conversion function learning information from the item embedding vector in a non-linear manner;

obtaining an association matrix between the first conversion vector and the second conversion vector;

obtaining the importance representation according to the association matrix.

Preferably, obtaining the importance representation according to the association matrix includes:

obtaining an average similarity of one item in the current section and other items in the current conversation session according to the association matrix as an importance score of the one item;

obtaining the importance representation of the one item by normalizing the importance score using a first normalization layer.

Preferably, a diagonal line of the association matrix is blocked by one blocking operation during a process of obtaining the importance representation according to the association matrix.

Preferably, the target item is obtained and recommended to the user by calculating probabilities that all items in the item set are recommended according to the preference representation.

Preferably, obtaining and recommending the target item to the user by calculating the probabilities that all items in the item set are recommended according to the preference representation and the item embedding vector includes:

obtaining each preference score of each item in the current conversation session correspondingly by multiplying each item embedding vector by a transpose matrix of the preference representations;

obtaining the probability that each item is recommended by normalizing each preference score using a second normalization layer;

selecting the items corresponding to one group of probabilities with sizes ranked top among all probabilities as the target items to be recommended to the user.

Preferably, the recommendation model is trained with a back propagation algorithm.

Preferably, a parameter of the recommendation model is learned by using a cross entropy function as an optimization target.

Provided is an item recommendation system based on importance of item in a conversation session, configured to predict an item that a user is likely to interact at a next moment from an item set as a target item to be recommended to a user, including:

an embedding layer module, configured to obtain each item embedding vector by embedding each item in a current conversation session to one d-dimension vector representation;

an importance extracting module, configured to extract an importance representation of each item according to the item embedding vector;

a current interest obtaining module, configured to obtain an item embedding vector corresponding to the last item in the current conversation session as a current interest representation of the user;

a long-term preference obtaining module, configured to obtain a long-term preference representation of the user by combining the importance representation with the item embedding vector;

a user preference obtaining module, configured to obtain a preference representation of the user by connecting the current interest representation and the long-term preference representation;

a recommendation generating module, configured to obtain and recommend the target item to the user according to the preference representation and the item embedding vector.

Preferably, the importance extracting module includes:

a first non-linear layer and a second linear layer, respectively configured to convert an embedding vector set formed by each item embedding vector by a non-linear conversion function to a first vector space and a second vector space so as to obtain a first conversion vector and a second conversion vector respectively, wherein the non-linear conversion function is a conversion function learning information from the item embedding vector in a non-linear manner;

an average similarity calculating layer, configured to calculate an average similarity of one item in the current conversation session and other items in the current conversation session according to an association matrix between the first conversion vector and the second conversion vector to characterize an importance score of the one item;

a first normalizing layer, configured to obtain the importance representation of the one item by normalizing the importance score.

As can be seen, in the item recommendation method based on importance of item in a conversation session and a system thereof provided in the present disclosure, the importance extracting module extracts the importance of each item in the conversation session, and then a long-term preference of a user is obtained in combination with the importance and the corresponding item, and then the preference of the user is accurately obtained in combination with the current interest and long-term preference of the user, and finally item recommendation is performed according to the preference of the user. In this way, the accuracy of item recommendation is improved, and the calculation complexity of the item recommendation model is reduced.

DETAILED DESCRIPTIONS OF EMBODIMENTS

The technical solutions of the examples of the present disclosure will be fully and clearly described below in combination with the accompanying drawings of the examples of the present disclosure. Apparently, these described examples are merely some of the examples of the present disclosure rather than all examples. Other examples obtained by those skilled in the art without paying creative work based on these examples will fall within the scope of protection of the present disclosure. It should be further noted that "the" in the detailed embodiments of the present disclosure only refers to technical belonging or feature in the present disclosure.

The main purpose of an item recommendation based on conversation session contents is to predict an item in which a user is likely to be interested at a next moment from an item set $V_t=\{v_1, v_2, \ldots, v_{|v|}\}$ according to a current conversation session and recommend it as a target item to the user. For example, the item set is $V_t=\{v_1, v_2, \ldots, v_{|v|}\}$, a current conversation session is denoted as $S_t$, and the current conversation session $S_t$ is a conversation session $S_t=\{s_1, s_2, \ldots, s_t\}$ formed by t items at a time stamp. In this case, the next item that the user is likely to interact (the item in which the user is likely to be interested at a next time stamp) is predicted as $s_{t+1}$ from the conversation session.

Figure 1:
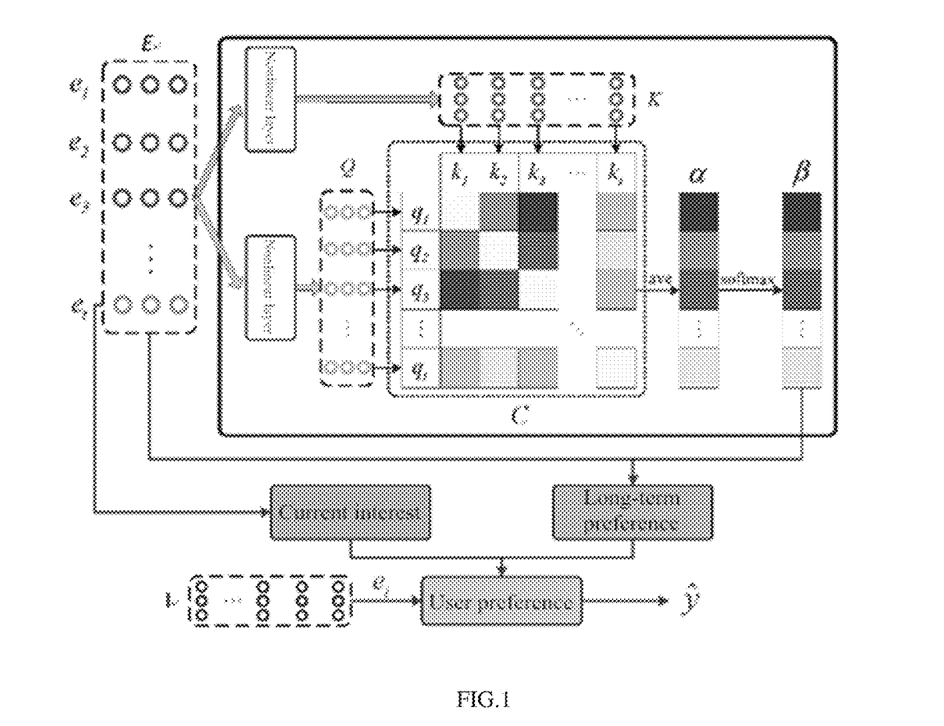
FIG. 1 is a block diagram of an item recommendation model based on importance of item in a conversation session according to the present disclosure.

In order to improve the accuracy of performing item recommendation based on conversation session contents, we consider the importance of item in the current conversation session in building a recommendation model, so as to more accurately obtain a preference of a user according to the importance of item and perform item recommendation according to the preference of the user. Thus, we provide an item recommendation method based on importance of item in a conversation session, in which a next item that a user is likely to interact is predicted from an item set as a target item to be recommended to the user. The method is mainly performed by a recommendation model shown in FIG. 1 but not limited to implementation by the model shown in FIG. 1. FIG. 1 is an item recommendation model based on importance of item in a conversation session. A system run by the item recommendation model shown in FIG. 1 is an item recommendation system based on importance of item in a conversation session.

The item recommendation method based on importance of item in a conversation session according to the present disclosure mainly includes the following steps performed by a trained item recommendation model (the recommendation model shown in FIG. 1).

At step 1, an item embedding vector is obtained by embedding each item in a current conversation session to one d-dimension vector representation, and the item embedding vector corresponding to the last item in the current conversation session is taken as a current interest representation of the user.

Firstly, the item embedding vector $e_i, e_i \in R$ is obtained by embedding each item $x_i$ in the current conversation session $S_t=\{x_1, x_2, \ldots, x_t\}$ to one d-dimension vector through one embedding layer, where $x_i (1 \leq i \leq t)$ refers to the i-th item in the conversation session $S_t$. The conversation session $S_t$ is an expression of the vector, and thus s, is the i-th component of the conversation session vector. The item embedding vectors $e_1, e_2, \ldots, e_t$ constitute the first component, the second component, . . . the t-th component of the first column of an item embedding vector set E in sequence from top down. Considering the last item $x_t$ reflects the latest interaction of the user, we directly select the last component $e_t$ (the item embedding vector corresponding to the last item in the current conversation session) after the embedding vector set E to represent the current interest $Z_s$ of the user in the current conversation session. Thus, the current interest can be expressed in the following formula (1):

$$Z_s = e_t \quad (1)$$

At step 2, an importance representation of each item is obtained according to the item embedding vector.

In order to accurately locate an important item in a conversation session to model a preference of a user, an importance extracting module (IEM) is disposed in the recommendation model proposed by us so that the importance representation of the item $x_i$ is generated according to the item embedding vector $e_i$. In the importance extracting module, two non-linear layers are enabled to convert the vector set E formed by the item embedding vectors $e_i$ to a first vector space query Q and a second vector space key K through a nonlinear function sigmoid, so as to obtain a first conversion vector Q and a second conversion vector K, respectively. The two conversion vectors are expressed in the following formulas (2) and (3):

$$Q = \text{sigmoid}(W_q E) \quad (2)$$

$$K = \text{sigmoid}(W_k E) \quad (3)$$

Herein, the $w_q \in R^{d \times l}$ and $w_k \in R^{d \times l}$ are trainable parameters corresponding to query and key; l is a dimension of an attention mechanism adopted in the process of performing formulas (2) and (3); and sigmoid is a conversion function learning information from the item embedding vector in a nonlinear manner.

After generation of representations of Q and K, the importance of each item may be estimated according to Q and K in the following steps.

Firstly, an association matrix between Q and K is introduced to calculate a similarity between every two items in the current conversation session in the following formula (4):

$$C = \frac{\text{sigmoid}(QK^T)}{\sqrt{d}} \quad (4)$$

The $\sqrt{d}$ herein is used to reduce the attention pro rata. In the association matrix, if similarities between one item and other items are all relatively low, it is considered that this item is not important. The user may interact with such an item occasionally or for curiosity. On the contrary, if one item is similar to most items in the conversation session, this item may express a main preference of the user. That is, the item is relatively important. Enlightened by the above descriptions, we take an average similarity of one item and other items in a conversation session as an importance characterization parameter of the item. In order to avoid a high similarity of same items in terms of Q and K, we apply one blocking operation to block a diagonal line of the association matrix and then calculate the average similarity. Thus, we can calculate one importance score $\alpha_i$ for each item $x_i$ which is expressed in the following formula (5):

$$\alpha_i = \frac{1}{t} \sum_{j=1, j \neq i}^{t} C_{ij} \quad (5)$$

Herein, $c_{ij} \in c$. In order to normalize the importance score $\alpha_i$, operations are performed using a softmax layer to obtain an importance representation $\beta_i$ of the final item. The calculation formula is as follows:

$$\beta_i = \frac{\exp(\alpha_i)}{\Sigma_p \exp(\alpha_p)}, \forall i = 1, 2, \ldots, t. \quad (6)$$

At step 3, a long-term preference of the user is obtained by combining the importance representation with the item embedding vector.

We obtain the importance representation $\beta_i$ of each item in the conversation session by use of the importance extracting module. The importance representation reflects a relevance of each item and a main intention of the user. Next, we obtain the long-term preference $z_l$ of the user by combining the importance of each item in the conversation session with the item in the following formula (7):

$$z_l = \sum_{i=1}^{t} \beta_i e_i \qquad (7)$$

At step 4, a preference representation of the user is obtained by connecting the current interest representation and the long-term preference representation through a connection operation.

After obtaining the long-term preference $Z_l$ and the current interest $Z_s$ of the user, we obtain the final preference representation of the user by combining the long-term preference and current interest in the following formula (8):

$$z_h = W_0[z_l; z_s] \qquad (8)$$

At step 5, the target item is obtained and recommended to the user according to the preference representation and the item embedding vector.

After the preference representation of the user is generated in the conversation session, we generate item recommendations by calculating probabilities that all items in a candidate item set V are recommended by using the preference representation. Firstly, we calculate a preference score $\hat{z}_i$ of the user for each item in the candidate item set V through multiplication operation based on the following formula (9):

$$\hat{z}_i = z_h^T e_i \qquad (9)$$

Herein, $z_h$ is obtained by the formula (8), and $e_i$ is an embedding vector of each item. Before the multiplication operation, the item embedding vectors constitute the first component, the second component, . . . the t-th component on the first row of the embedding vector set I from left to right in sequence. Then, a normalization probability that each item is recommended is obtained by performing normalization for each preference score using a normalization layer softmax layer.

$$\hat{y} = \text{soft max}(\hat{z}) \qquad (10)$$

Herein, $\hat{z}=(\hat{z}_1, \hat{z}_2, \ldots, \hat{z}_n)$. After the normalization probability corresponding to each item is obtained, the items corresponding to a group of probabilities with size ranked top among the probabilities are taken as target items to be recommended to the user.

In order to training the model, we adopt a cross entropy function as an optimization target to learn a parameter in the following formula (11):

$$L(\hat{y}) = -\sum_{i=1}^{n} y_i \log(\hat{y}_i) + (1 - y_i)\log(1 - \hat{y}_i) \qquad (11)$$

Herein, $y_i \in y$ reflects whether a particular item appears in a one-hot encoding of real purchase, that is, if the target item of the conversation session is given at the time of the i-th item, $y_i=1$ and otherwise, $y_i=0$. Finally, we train the recommendation model using a back propagation algorithm.

The present disclosure further provides an item recommendation system based on importance of item in a conversation session for realizing the recommendation method of the present disclosure. As shown in FIG. 1, the item recommendation system mainly includes an embedding layer module (shown in FIG. 1), an importance extracting module, a current interest obtaining module (corresponding to the current interest shown in FIG. 1), a long-term preference obtaining module (corresponding to the long-term preference shown in FIG. 1), and a recommendation generating module (not shown in FIG. 1).

The embedding layer module is configured to obtain each item embedding vector by embedding each item in the current conversation session to one d-dimension vector representation, the importance extracting module is configured to extract the importance representation of each item according to the item embedding vector, the current interest obtaining module is configured to obtain the item embedding vector corresponding to the last item in the current conversation session as a current interest representation of the user, the long-term preference obtaining module is configured to obtain the long-term preference representation of the user by combining the importance representation with the item embedding vector, the user preference obtaining module is configured to obtain the preference representation of the user by connecting the current interest representation and the long-term preference representation, and the recommendation generating module is configured to obtain and recommend the target item to the user according to the preference representation and the item embedding vector. The importance extracting module further includes a first nonlinear layer and a second linear layer (nonlinear layers are shown in FIG. 1) which are used respectively to convert the embedding vector set formed by the item embedding vectors to the first vector space and the second vector space through a nonlinear conversion function, so as to obtain the first conversion vector Q and the second conversion vector K, where the nonlinear conversion function is a conversion function learning information from the item embedding vector in a nonlinear manner. The importance extracting module further includes an average similarity calculating layer, configured to calculate an average similarity of one item in the current conversation session and other items in the current conversation session according to an association matrix between the first conversion vector and the second conversion vector to characterize an importance score of the one item and a normalization layer, configured to obtain the importance representation of the one item by normalizing the importance score.

In order to verify the effectiveness and the recommendation accuracy of the recommendation method based on importance of item in a conversation session and the system thereof in the present disclosure, we perform evaluation for the item recommendation method and the system thereof in the present disclosure on two reference datasets YOOCHOOSE and DIGINETICA, where the statistical data of the datasets YOOCHOOSE and DIGINETICA are shown in the following Table 1.

TABLE 1

| DATA | YOOCHOOSE | DIGINETICA |
|---|---|---|
| CLICK | 557,248 | 982,961 |
| TRAINING CONVERSATION SESSION | 369,859 | 719,470 |
| TEST CONVERSATION SESSION | 55,898 | 60,858 |
| ITEM | 16,766 | 43,097 |
| AVERAGE CONVERSATION SESSION LENGTH | 6.16 | 5.12 |

We verify the effect of the item recommendation method provided by us by comparing the performance of the item recommendation model SR-IEM based on importance of item in a conversation session in the present disclosure with the performance of 8 existing reference models based on conversation session recommendation, where the 8 reference models include three traditional methods (S-POP, Item-KNN and FPMC) and five neural models (GRU4REC, NARM, STAMP, CSRM and SR-GNN). The two datasets used by use for evaluation are two disclosed reference e-merchant datasets, i.e. YOOCHOOSE and DIGINETICA. We set a maximum conversation session length as 10, that is, we only consider the latest 10 items in a case of excessive conversation session length. The item embedding vector and the dimension of the attention mechanism are set to d=200 and l=100 respectively. We adopt Adam as an optimizer with an initial learning rate set to $10^{-3}$, which attenuates by 0.1 for every three cycles. The batch size is set to 128. Further, we use the Recall@20N and the MRR@N index to evaluate the effects of the item recommendation model SR-IEM based on importance of item in a conversation session and various reference models with N set to 20 in our experiment. Table 2 shows the comparison results of the performances of the item recommendation model SR-IEM provided by the present disclosure and eight existing reference models based on conversation session recommendation, where the optimal reference model and the results of the optimal model in each column are highlighted with underlines and bold ▲ for representation of t test. It can be seen from Table 2 that the neural network models of the eight existing reference models are generally superior to the traditional method. For example, SR-GNN performs best in terms of two indexes on the YOOCHOOSE dataset, whereas the item recommendation model SR-IEM provided by the present disclosure has much better performance than the optimal reference models. However, the CSRM model performs best in terms of Recall@20 on the DIGINETICA dataset. With application of GGNN model, the SR-GNN model can model a complex inter-item transfer relationship to produce an accurate user preference. Based on the NARM model, the CSRM model introduces a neighbor conversation session so that it performs better than other reference models. Therefore, we select CSRN and SR-GNN as reference models in the subsequent experiments.

TABLE 2

| | YOOCHOOSE | | DIGINETICA | |
|---|---|---|---|---|
| Method | Recall @ 20 | MRR @ 20 | Recall @ 20 | MRR @ 20 |
| S-POP | 30.44 | 18.35 | 21.06 | 13.68 |
| Item-KNN | 51.60 | 21.81 | 35.75 | 11.57 |
| FPMC | 45.62 | 15.01 | 31.55 | 8.92 |
| GRU4REC | 60.64 | 22.89 | 29.45 | 8.33 |

TABLE 2-continued

| | YOOCHOOSE | | DIGINETICA | |
|---|---|---|---|---|
| Method | Recall @ 20 | MRR @ 20 | Recall @ 20 | MRR @ 20 |
| NARM | 68.32 | 28.63 | 49.70 | 16.17 |
| STAMP | 68.74 | 29.67 | 45.64 | 14.32 |
| CSRM | 69.85 | 29.71 | 51.69 | 16.92 |
| SR-GNN | 70.57 | 30.94 | 50.73 | 17.59 |
| SR-IEM | 71.11 ▲ | 31.23 ▲ | 52.32 ▲ | 17.74 ▲ |

Next, we focus on the performance of the item recommendation model SR-IEM provided by the present disclosure. Generally, the SR-IEM model is superior to all reference models in the two indexes of the two datasets. For example, on the YOOCHOOSE dataset, the SR-IEM model has an increase of 2.49% in terms of MRR@20 over the best reference model SR-GNN, which is higher than the increase of 0.82% in terms of Recall@20. Conversely, on the DIGINETICA dataset, the increase on Recall@20 is higher than the increase on MRR@20 for the possible reason of the size of the item set. SR-IEM is more capable of increasing the ranking of the target item in a case of fewer candidate items, and is more effective in hitting the target item in a case of more candidate items.

Further, we analyze the calculation complexities of the SR-IEM model and two best reference models (CSRM model and SR-GNN model). For the CSRM model and the SR-GNN model, the calculation complexities are $O(td^2+dM+d^2)$ and $O(s(td^2+t^3)+d^2)$ respectively, where t refers to a conversation session length, d refers to a dimension of an item embedding vector, M refers to a number of neighbor conversation sessions introduced by the CSRM model, and s refers to a number of training steps in GGNN. For the SR-IEM model, the calculation complexity is $O(t^2+d+d^2)$, which mainly comes from the importance extracting module $O(t^2d+d^2)$ and other modules $O(d^2)$. Because t<d and d<<M, the calculation complexity of the SR-IEM is obviously lower than the SR-GNN and CSRM. In order to verify the point empirically, we compare the training times and the test times of the SR-IEM model, the CSRM model and the SR-GNN model. We find that the time consumption of the SR-IEM model is obviously smaller than the CSRM model and the SR-GNN model. It indicates that compared with the reference models, the SR-IEM model performs best in terms of recommendation accuracy and the calculation complexity, providing feasibility for its potential application.

Figure 2:
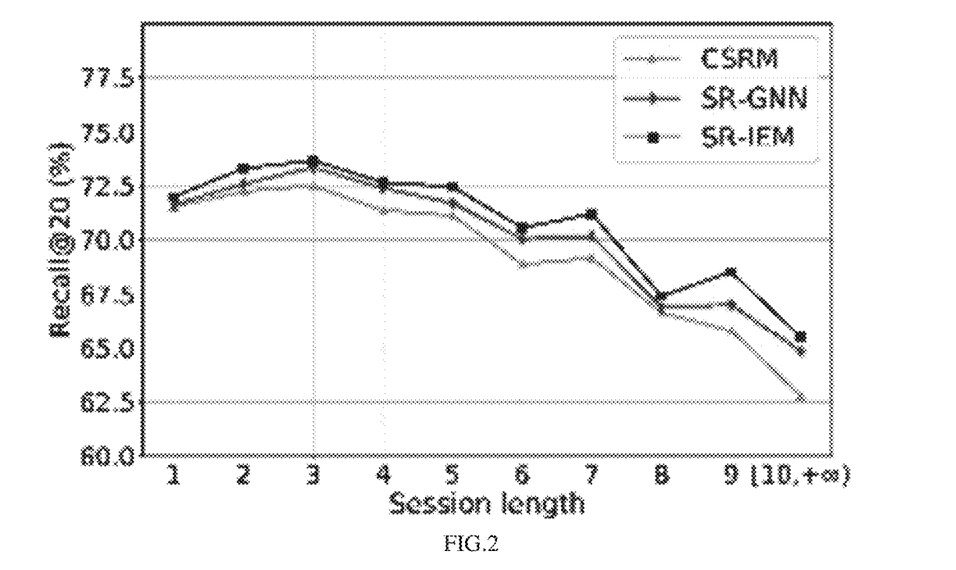
FIG. 2 is a schematic diagram of a comparison result of SR-IEM model, CSRM model, and SR-GNN model in terms of Recall@20 index of YOOCHOOSE dataset.
Figure 3:
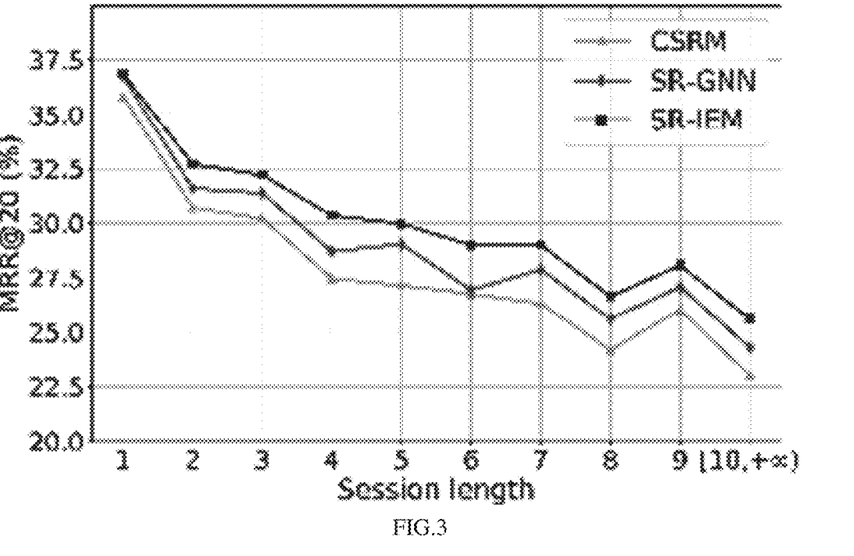
FIG. 3 is a schematic diagram of a comparison result of SR-IEM model, CSRM model, and SR-GNN model in terms of MRR@20 index of YOOCHOOSE dataset.
Figure 4:
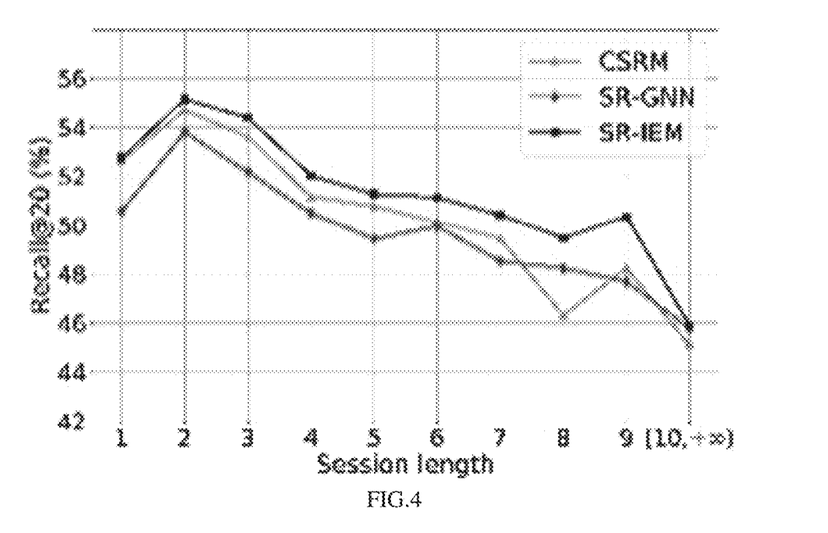
FIG. 4 is a schematic diagram of a comparison result of SR-IEM model, CSRM model, and SR-GNN model in terms of Recall@20 index of DIGINETICA dataset.
Figure 5:
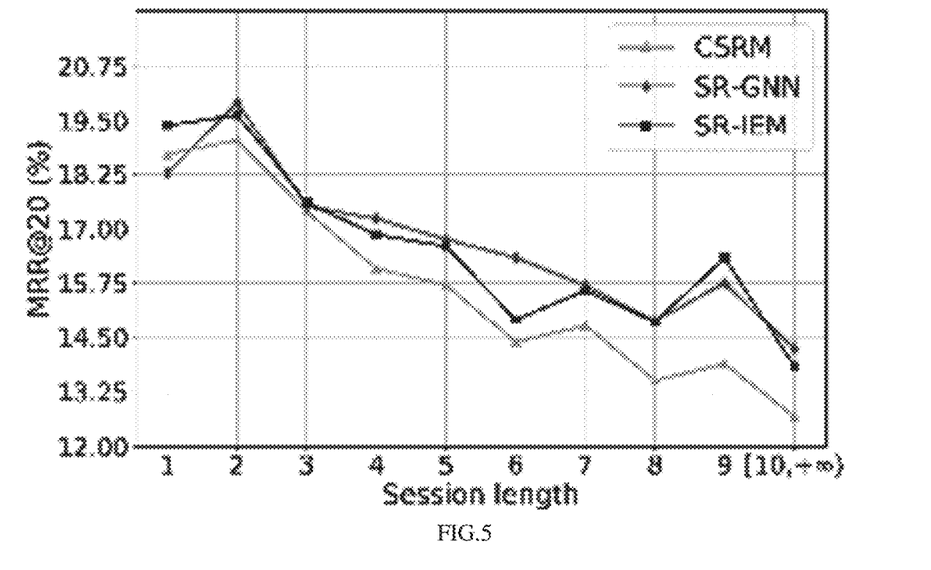
FIG. 5 is a schematic diagram of a comparison result of SR-IEM model, CSRM model, and SR-GNN model in terms of MRR@20 index of DIGINETICA dataset.

Further, the influence of the conversation session length on the effect of the item recommendation model SR-IEM model provided by the present disclosure is analyzed in the present disclosure as shown in FIGS. 2-5. FIG. 2 is a schematic diagram of a comparison result of SR-IEM model, CSRM model, and SR-GNN model in terms of Recall@20 index of YOOCHOOSE dataset. FIG. 3 is a schematic diagram of a comparison result of SR-IEM model, CSRM model, and SR-GNN model in terms of MRR@20 index of YOOCHOOSE dataset. FIG. 4 is a schematic diagram of a comparison result of SR-IEM model, CSRM model, and SR-GNN model in terms of Recall@20 index of DIGINETICA dataset. FIG. 5 is a schematic diagram of a comparison result of SR-IEM model, CSRM model, and SR-GNN model in terms of MRR@20 index of DIGINETICA dataset. From FIGS. 2-5, we can see that the performances of the three models firstly increase and then continuously decrease along with the increase of the conversation session length. According to the comparison result of Recall@20 index, it can be seen that the SR-IEM has a much larger increase on the conversation session length of 4-7 than the increase on the conversation session length of 1-3 compared with the CSRM model, and the SR-GNN model. The reasons is as follows: when the conversation session length is excessively short, the importance extracting module IEM in the item recommendation model SR-IEM model provided by the present disclosure is not capable of distinguishing the importance of items well, but has a better effect along with the increase of the length. According to the comparison result of the MRR@20, it can be seen that the performances of the SR-IEM model, CSRM model, and SR-GNN model show a trend of continuous decrease along with increase of the conversation session length. On the YOOCHOOSE dataset, the SR-IEM model performs better than the CSRM model, and SR-GNN model in all lengths. However, on the DIGINETICA dataset, the SR-GNN model performs better in some lengths, for example, in the lengths of 4 and 5. Further, on the YOOCHOOSE dataset, the SR-IEM model has a continuous decrease in terms of MRR@20 rather than firstly has an increase in terms of Recall@20. Further, on the DIGINETICA dataset, the score of the SR-IEM model in terms of MRR@20 decreases faster than in terms of Recall@20. The differences of the SR-IEM model in terms of Recall@20 and MRR@20 on the two datasets may be because the irrelevant items in a short conversation session have a larger unfavorable effect on MRR@20 than on Recall@20.

Figure 6:
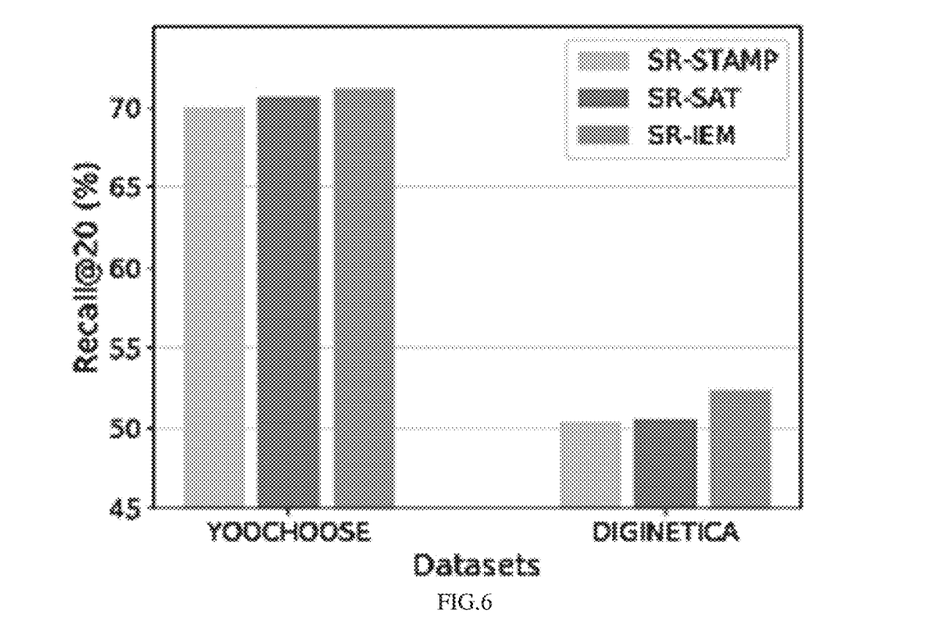
FIG. 6 is a schematic diagram of a comparison result of SR-IEM model, SR-STAMP model, and SR-SAT model in terms of Recall@20 index.
Figure 7:
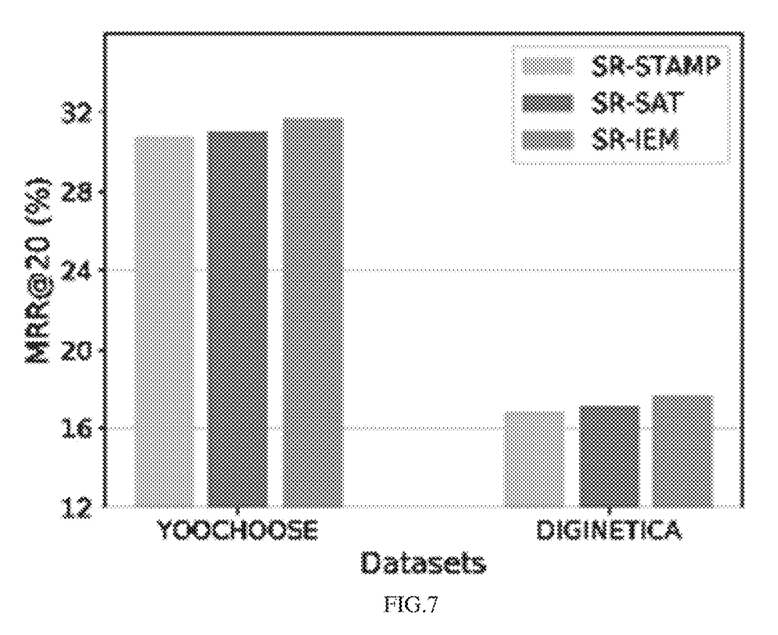
FIG. 7 is a schematic diagram of a comparison result of SR-IEM model, SR-STAMP model, and SR-SAT model in terms of MRR@20 index.

In order to verify the effect of the importance extracting module IEM in the item recommendation model SR-IEM model provided by the present disclosure in improving the item recommendation accuracy, we obtain a variation item recommendation model of the present disclosure by substituting two substitute modules for the IEM module in the SR-IEM model. For the first variation, the first variation item recommendation model SR-STAMP model of the present disclosure is obtained by replacing the importance extracting module IEM in FIG. 1 with an existing attention mechanism module, and the mixture of all items and the last item in the SR-STAMP model conversation session are regarded as the "key" relevance amount of the present disclosure. For the second variation, the importance extracting module IEM in FIG. 1 is replaced with another existing attention mechanism to distinguish the importance of the items, and then the second variation item recommendation model SR-SAT model of the present disclosure is obtained by aggregating the importance with the average pooling strategy. Then, we compare the performances of the SR-IEM model, the SR-STAMP model and the SR-SAT model in terms of Recall@20 index and MRR@20 index with a comparison result shown in FIGS. 6 and 7. FIG. 6 is a schematic diagram of a comparison result of SR-IEM model, SR-STAMP model, and SR-SAT model in terms of Recall@20 index. FIG. 7 is a schematic diagram of a comparison result of SR-IEM model, SR-STAMP model, and SR-SAT model in terms of MRR@20 index.

Generally, the SR-IEM model performs best in terms of Recall @20 index and MRR@20 index on the two datasets and the SR-SAT model performs better than the SR-STAMP model. This is possibly because the SR-SAT model considers the relationship between items in the context of the conversation session and is capable of capturing a user preference so as to produce a correct item recommendation, and the SR-STAMP model determines the importance of item by only using the mixture of all items and the last item, and thus cannot represent a preference of a user accurately. In addition, it is difficult for the SR-SAT model and the SR-STAMP model to remove irrelevant items in the conversation session, which have negative effect on the recommendation performance. It can be seen that the IEM module proposed by us can effectively locate the important item, and allocate a higher weight to them at the time of modeling the preference of the user, so as to avoid interference of other items in the conversation session.

As can be seen, in the item recommendation method based on importance of item in a conversation session and a system thereof provided in the present disclosure, the importance extracting module extracts the importance of each item in the conversation session, and then a long-term preference of a user is obtained in combination with the importance and the corresponding item, and then the preference of the user is accurately obtained in combination with the current interest and long-term preference of the user, and finally item recommendation is performed according to the preference of the user. In this way, the accuracy of item recommendation is improved, and the calculation complexity of the item recommendation model is reduced.

Figure 8:
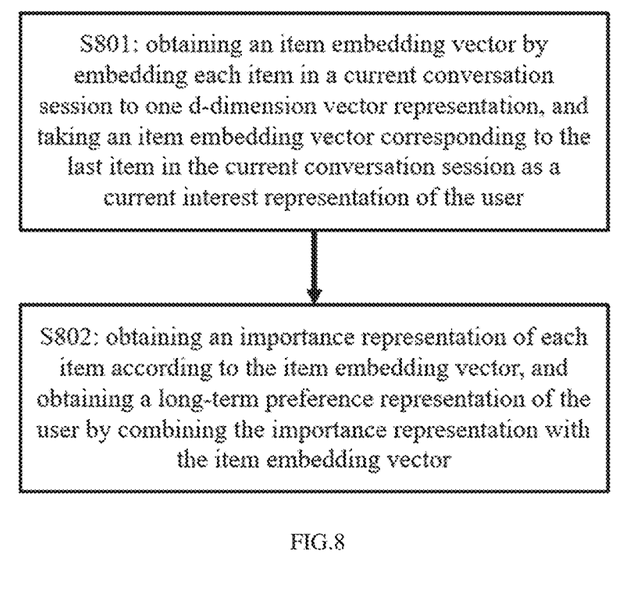
FIG. 8 is a flowchart illustrating an exemplary item recommendation method according to an embodiment of the present disclosure.

FIG. 8 is a flowchart illustrating an exemplary item recommendation method according to an embodiment of the present disclosure.

With reference to FIG. 8, the item recommendation method may begin with a step S801: obtaining an item embedding vector by embedding each item in a current conversation session to one d-dimension vector representation, and taking an item embedding vector corresponding to the last item in the current conversation session as a current interest representation of the user.

Subsequently, the item recommendation method may continue to a step S802: obtaining an importance representation of each item according to the item embedding vector, and obtaining a long-term preference representation of the user by combining the importance representation with the item embedding vector. The particulars of step S802 are described below with reference to FIG. 9.

Figure 9:
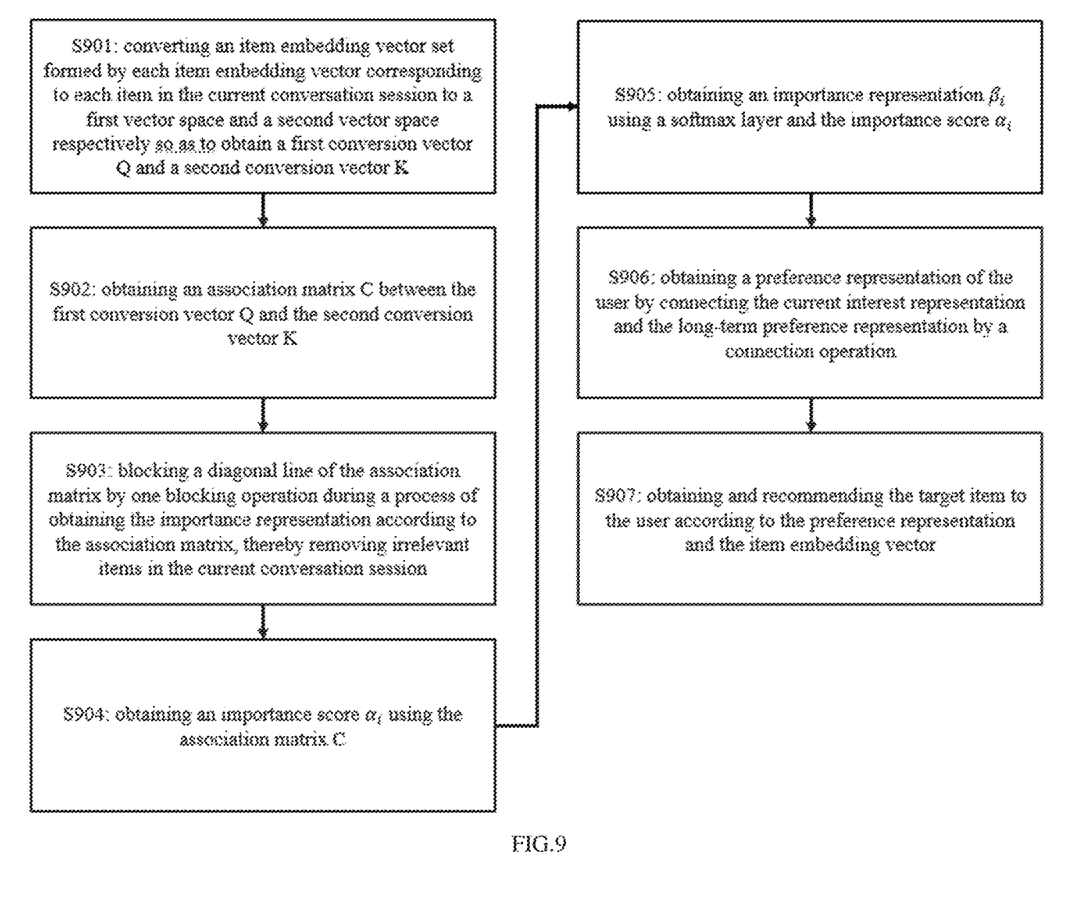
FIG. 9 is a flowchart illustrating an exemplary method for obtaining an importance representation according to an embodiment of the present disclosure.

FIG. 9 is a flowchart illustrating an exemplary method for obtaining an importance representation according to an embodiment of the present disclosure.

The method of FIG. 9 begins with a step S901: converting an item embedding vector set formed by each item embedding vector corresponding to each item in the current conversation session to a first vector space and a second vector space respectively so as to obtain a first conversion vector Q and a second conversion vector K.

The method continues with a step S902: obtaining an association matrix C between the first conversion vector Q and the second conversion vector K.

The method continues with a step S903: blocking a diagonal line of the association matrix by one blocking operation during a process of obtaining the importance representation according to the association matrix, thereby removing irrelevant items in the current conversation session.

The method continues with a step S904: obtaining an importance score $\alpha_i$ using the association matrix C.

The method continues with a step S905: obtaining an importance representation $\beta_i$ using a softmax layer and the importance score $\alpha_i$.

The method continues with a step S906: obtaining a preference representation of the user by connecting the current interest representation and the long-term preference representation by a connection operation.

The method continues with a step S907: obtaining and recommending the target item to the user according to the preference representation and the item embedding vector.

Figure 10:
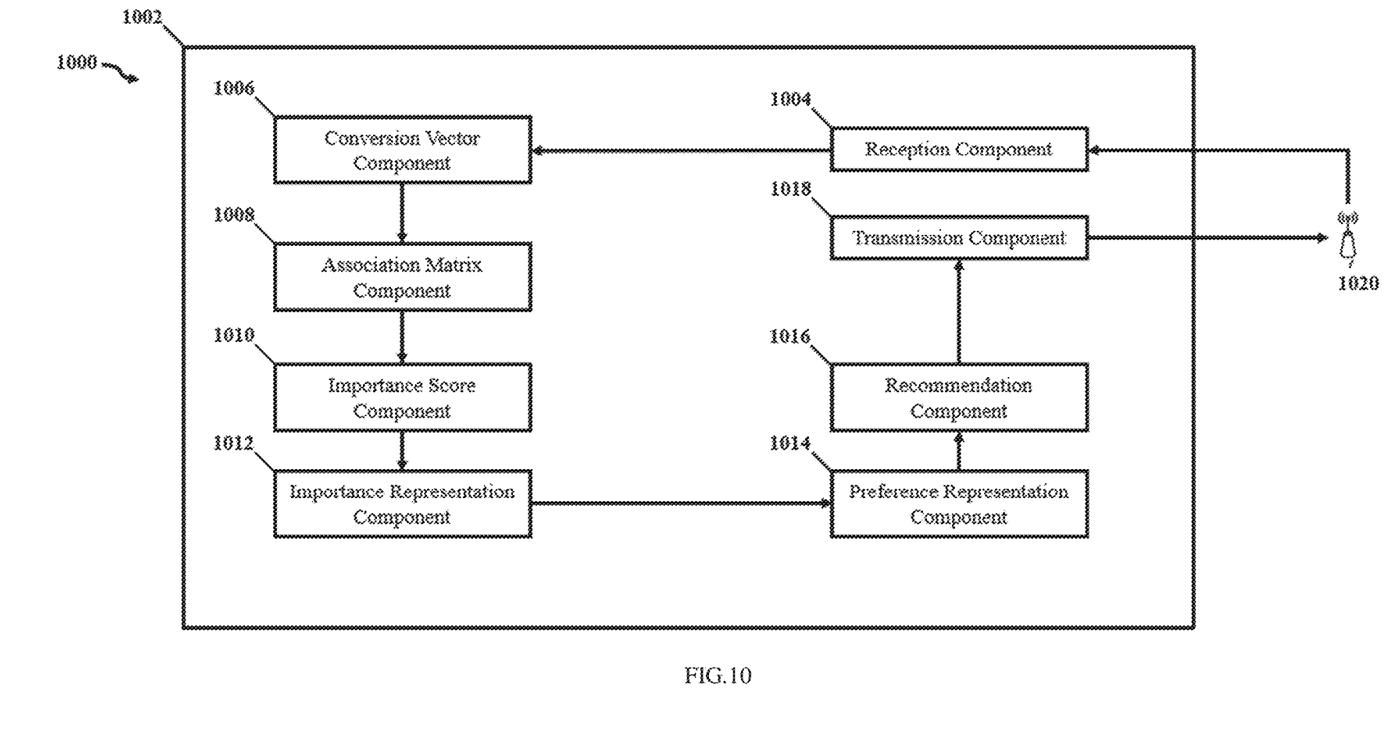
FIG. 10 is a conceptual data flow diagram illustrating the data flow between different means/components in an exemplary apparatus according to an embodiment of the present disclosure.

FIG. 10 is a conceptual data flow diagram 1000 illustrating the data flow between different means/components in an exemplary apparatus 1002. Apparatus 1002 includes a reception component 1004, a conversion vector component 1006, an association matrix component 1008, an importance score component 1010, an importance representation component 1012, a preference representation component 1014, a recommendation component 1016, and a transmission component 1018.

Apparatus 1002 may communicate with receiver 1020, where receiver 1020 may receive data from a user and transmit the data to apparatus 1002. Receiver 1020 may include one or more input devices, where the input devices may be one or more of a microphone, camera, camcorder, biometric scanner, keyboard, mouse, touchpad, touchscreen, controller, etc. Input data from a conversation session of a user may be analyzed to determine a preference representation of the user, and from the preference representation, an accurate item recommendation may be presented to the user. In one embodiment, reception component 1014 may be configured to obtaining an item embedding vector by embedding each item in a current conversation session to one d-dimension vector representation, and taking an item embedding vector corresponding to the last item in the current conversation session as a current interest representation of the user.

Conversion vector component 1006 may be configured to convert an item embedding vector set formed by each item embedding vector corresponding to each item in the current conversation session to a first vector space and a second vector space respectively so as to obtain a first conversion vector Q and a second conversion vector K. Association matrix component 1008 may be configured to obtain an association matrix C between the first conversion vector Q and the second conversion vector K. During the method performed by apparatus 1002, a diagonal line of the association matrix may be blocked by one blocking operation during a process of obtaining the importance representation according to the association matrix, thereby removing irrelevant items in the current conversation session. Importance score component 1010 may be configured to obtain an importance score $\alpha_i$ using the association matrix C. Importance representation component 1012 may be configured to obtain an importance representation $\beta_i$ using a softmax layer and the importance score $\alpha_i$. Preference representation component 1014 may be configured to obtain a preference representation of the user by connecting the current interest representation and the long-term preference representation by a connection operation. Recommendation component 1016 may be configured to obtain and recommend the target item to the user according to the preference representation and the item embedding vector.

Transmission component 1010 is configured to transmit the results of apparatus 1002 to receiver 1018. The results of apparatus 1002 may be used to display a recommended target item to the user via one or more output devices of receiver 1018. The output devices may be, for example, without limitation, one or more of a display device, a printer, a speaker, a projector, etc.

The apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
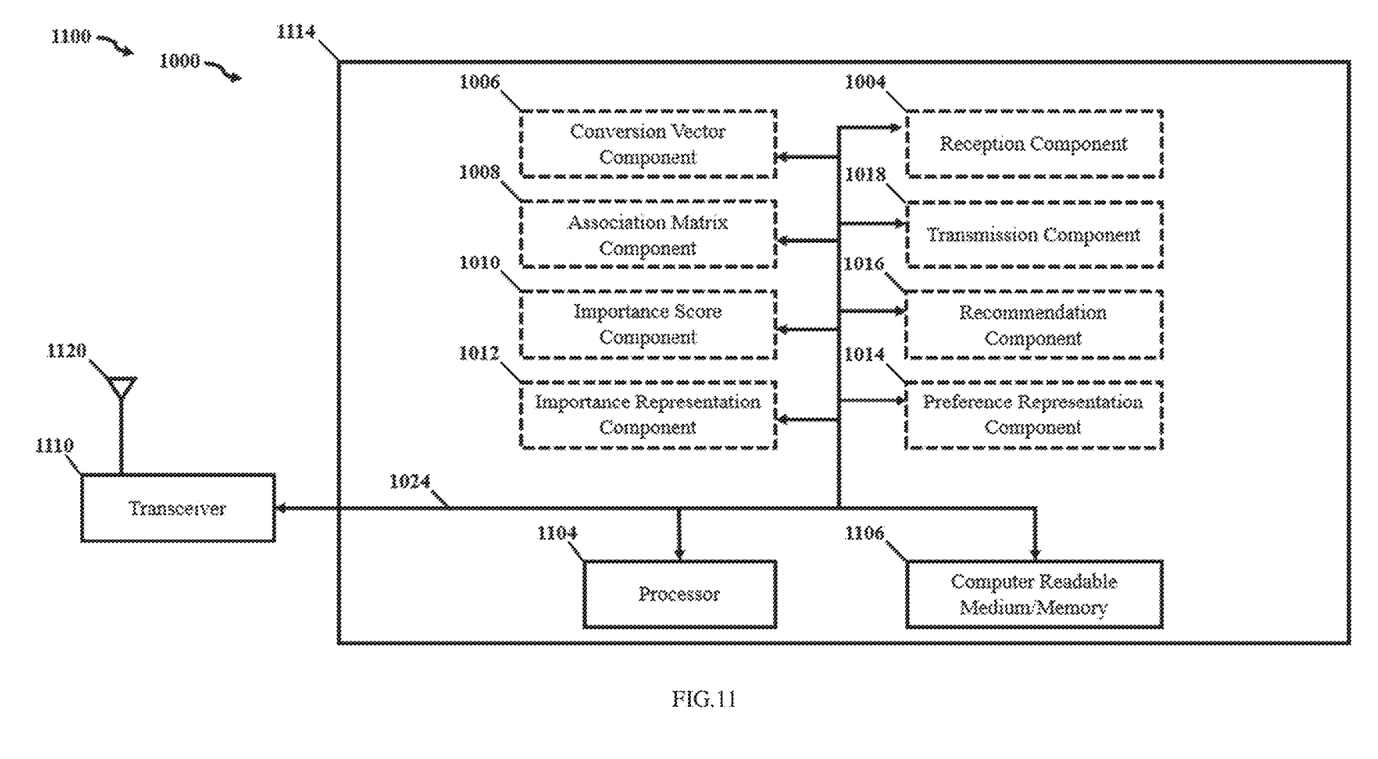
FIG. 11 is a diagram illustrating an example of a hardware implementation for an apparatus employing a processing system according to an embodiment of the present disclosure.

FIG. 11 is a diagram 1100 illustrating an example of a hardware implementation for an apparatus 1002 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1012, 1014, 1016, and 1018, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1012, 1014, 1016, and 1018. The components may be software components running in the processor 1104, resident/stored in the computer readable medium/memory 1106, one or more hardware components coupled to the processor 1104, or some combination thereof.

In one configuration, the apparatus 1002 includes means for obtaining an item embedding vector by embedding each item in a current conversation session to one d-dimension vector representation, and taking an item embedding vector corresponding to the last item in the current conversation session as a current interest representation of the user, means for obtaining an importance representation of each item according to the item embedding vector, and obtaining a long-term preference representation of the user by combining the importance representation with the item embedding vector, means for converting an item embedding vector set formed by each item embedding vector corresponding to each item in the current conversation session to a first vector space and a second vector space respectively so as to obtain a first conversion vector Q and a second conversion vector K, means for obtaining an association matrix C between the first conversion vector Q and the second conversion vector K, means for blocking a diagonal line of the association matrix by one blocking operation during a process of obtaining the importance representation according to the association matrix, thereby removing irrelevant items in the current conversation session, means for obtaining an importance score $\alpha_i$ using the association matrix C, means for obtaining an importance representation $\beta_i$ using a softmax layer and the importance score $\alpha_i$, means for obtaining a preference representation of the user by connecting the current interest representation and the long-term preference representation by a connection operation, and means for obtaining and recommending the target item to the user according to the preference representation and the item embedding vector. The aforementioned means may be one or more of the aforementioned components of the apparatus 1002 and/or the processing system 1114 of the apparatus 1002 configured to perform the functions recited by the aforementioned means.

The system and method of the present invention may be used for a wide variety of recommendation-based applications. For example, without limitation, recommendations may be generated based on the conversation session of the user for online shopping recommendations, hotel recommendations, catering recommendations, navigation recommendations, etc. The recommendations may be based on indirect or direct input from the user. For example, indirect input from the user may be a voice recording of the user via a microphone of a conversation conducted by the user, and direct input may be input provided directly by the user (e.g., an electronic survey).

The examples of the present disclosure do not exhaust all possible details nor limit the present disclosure to the specific examples of the present disclosure. Many changes and modifications may be made according to the above descriptions. The specific examples of the present disclosure are used only to explain the principle and the actual application of the present disclosure better, so that those skilled in the art may use the present disclosure well or change the present disclosure for use. The present disclosure is only limited by the claims, and its entire scope of protection and equivalents.

What is claimed is:

1. A system for performing an item recommendation method based on importance of item in a conversation session, configured to predict an item that a user is likely to interact at a next moment from an item set as a target item to be recommended to the user, comprising:
   a processor;
   a non-transitory computer readable memory coupled to the processor containing program instructions for performing the item recommendation method; and
   an input device;
   wherein the input device is configured to record an input from the user; and
   execution of the program instructions by the processor causes the processor to perform steps of an item recommendation model comprising:
   obtaining an item embedding vector by embedding each item in a current conversation session to one d-dimension vector representation, and taking an item embedding vector corresponding to the last item in the current conversation session as a current interest representation of the user, wherein the current conversation session is a voice recording of the user via a microphone of a conversation conducted by the user;
   obtaining an importance representation of each item according to the item embedding vector, and obtaining a long-term preference representation of the user by combining the importance representation with the item embedding vector, wherein the obtaining the importance representation of each item further comprises:
   converting an item embedding vector set formed by each item embedding vector corresponding to each item in the current conversation session to a first vector space and a second vector space respectively so as to obtain a first conversion vector Q and a second conversion vector K respectively and the first conversion vector Q and the second conversion vector K are calculated according to:

$$Q = sigmoid(W_q E) \quad (1)$$

$$K = sigmoid(W_k E) \quad (2)$$

where $W_q \in R^{d \times l}$ and $W_k \in R^{d \times l}$ are trainable parameters corresponding to a query and a key, respectively; l is a dimension of an attention mechanism adopted while performing formulas (1) and (2); and sigmoid is a conversion function learning information from the item embedding vector in a nonlinear manner;

adopting a cross entropy function as an optimization target to learn the trainable parameters;

implementing a back propagation algorithm to train the item recommendation model;

obtaining an association matrix C between the first conversion vector Q and the second conversion vector K, wherein the association matrix C is calculated according to:

$$C = \frac{sigmoid(QK^T)}{\sqrt{d}} \quad (3)$$

where $\sqrt{d}$ is used to reduce an attention pro rata;

blocking a diagonal line of the association matrix by one blocking operation during a process of obtaining the importance representation according to the association matrix, thereby removing irrelevant items in the current conversation session;

obtaining an importance score $\alpha_i$ using the association matrix C, wherein the importance score $\alpha_i$ is calculated according to:

$$\alpha_i = \frac{1}{t} \sum_{j=1, j \neq i}^{t} C_{ij}; \quad (4)$$

and obtaining the importance representation $\beta_i$ using a softmax layer and the importance score $\alpha_i$, wherein the importance representation $\beta_i$ is calculated according to:

$$\beta_i = \frac{\exp(\alpha_i)}{\sum_p \exp(\alpha_p)}, \forall i = 1, 2, \ldots, t; \quad (5)$$

obtaining a preference representation of the user by connecting the current interest representation and the long-term preference representation by a connection operation;

obtaining and recommending the target item to the user according to the preference representation and the item embedding vector, thus achieving the item recommendation method by focusing on importance of the item in the conversation session, wherein the target item is based on the current conversation session of the user comprises online shopping recommendations, hotel recommendations, catering recommendations, navigation recommendations;

capturing a preference of the user with unavailability of user-item interaction histories and delivering a recommended target item to the user, thereby improving accuracy of item recommendation and reducing calculation complexity of the item recommendation model; and displaying the target item to the user via one or more output devices of the receive, wherein the processing system is implemented with a bus architecture, represented by a bus that comprises a number of interconnecting buses and bridges;

the processing system is coupled to a transceiver that is coupled to one or more antennas; the transceiver communicates with other apparatus over a transmission medium; and transceiver receives a signal from the one or more antennas, extracts information from the received signal, and provides the extracted information to the processing system.

2. The system of claim 1, wherein obtaining the importance representation according to the association matrix comprises:

obtaining an average similarity of one item in the current section and other items in the current conversation session according to the association matrix as an importance score of the one item;

obtaining the importance representation of the one item by normalizing the importance score using a first normalization layer.

3. The system of claim 1, wherein the target item is obtained and recommended to the user by calculating probabilities that all items in the item set are recommended according to the preference representation.

4. The system of claim 3, wherein obtaining and recommending the target item to the user by calculating the probabilities that all items in the item set are recommended according to the preference representation and the item embedding vector comprises:

obtaining each preference score of each item in the current conversation session correspondingly by multiplying each item embedding vector by a transpose matrix of the preference representations;

obtaining the probability that each item is recommended by normalizing each preference score using a second normalization layer;

selecting the items corresponding to one group of probabilities with sizes ranked top among all probabilities as the target items to be recommended to the user.

5. The system of claim 1, wherein the obtaining a long-term preference representation of the user by combining the importance representation with the item embedding vector further comprises:

obtain the long-term preference $z_l$ of the user by combining the importance of each item in the conversation session with the item in the following formula (6):

$$z_l = \sum_{i=1}^{t} \beta_i e_i. \quad (6)$$

6. The system of claim 5, wherein the obtaining a preference representation of the user by connecting the current interest representation and the long-term preference representation by a connection operation further comprises;

after obtaining the long-term preference $Z_l$ and the current interest $Z_s$ of the user, obtaining a final preference representation of the user by combining the long-term preference and current interest in the following formula (7):

$$Z_h = W_0[z_l; z_s]. \quad (7)$$

7. The system of claim 6, wherein the obtaining and recommending the target item to the user according to the preference representation and the item embedding vector further comprises:

after the preference representation of the user is generated in the conversation session, generating item recommendations by calculating probabilities that all items in a candidate item set V are recommended by using the preference representation;

calculating a preference score $\hat{z}_i$ of the user for each item in the candidate item set V through multiplication operation based on the following formula (8):

$$\hat{z}_i = z_h^T e_i. \quad (8)$$

wherein $z_h$ is obtained by the formula (7), and $e_i$ is an embedding vector of each item; and a normalization probability that each item is recommended is obtained by performing normalization for each preference score using a normalization layer softmax layer $$\hat{y} = \text{soft max}(\hat{z}). \quad (9)$$

* * * * *